United States Patent
Tsai et al.

(10) Patent No.: US 7,793,218 B2
(45) Date of Patent: Sep. 7, 2010

(54) SYSTEM AND METHOD FOR CREATING A BUTTON MAP FOR IMPLEMENTING REMOTE CONTROL FUNCTIONS FOR A MOUSE IN A VIDEO PLAYBACK SYSTEM

(75) Inventors: Yi-Chao Tsai, Taipei (TW); Fu-Kai Juang, Taipei (TW)

(73) Assignee: Cyberlink Corp., Shindian City, Taipei (TW)

( * ) Notice: Subject to any disclaimer, the term of this patent is extended or adjusted under 35 U.S.C. 154(b) by 290 days.

(21) Appl. No.: 11/612,028

(22) Filed: Dec. 18, 2006

(65) Prior Publication Data
US 2008/0022206 A1 Jan. 24, 2008

Related U.S. Application Data

(60) Provisional application No. 60/807,941, filed on Jul. 21, 2006.

(51) Int. Cl.
G06F 3/00 (2006.01)
G06F 3/033 (2006.01)

(52) U.S. Cl. ........................ 715/720; 715/835
(58) Field of Classification Search ................ 715/835, 715/837, 838, 846, 810, 720, 825, 864
See application file for complete search history.

(56) References Cited

U.S. PATENT DOCUMENTS

| 5,721,853 | A | * | 2/1998 | Smith | 715/803 |
| 5,777,616 | A | * | 7/1998 | Bates et al. | 715/837 |
| 2002/0052182 | A1 | * | 5/2002 | Mayuzumi | 455/41 |
| 2004/0130523 | A1 | * | 7/2004 | Wellton Persson | 345/156 |
| 2008/0049142 | A1 | * | 2/2008 | Schohn et al. | 348/569 |

* cited by examiner

*Primary Examiner*—Thanh T Vu
(74) *Attorney, Agent, or Firm*—Thomas, Kayden, Horstemeyer & Risley, LLP

(57) ABSTRACT

Systems and methods for creating a button map for implementing remote control functions for a standard input/output device in a video playback system is described. One embodiment is directed to a method which includes first adding a button that is currently selected along with its neighboring selectable buttons to a button map, iteratively adding a new selectable button not in the button map and then adding all neighboring selectable buttons for the new button to the button map. Finally, the method includes selecting one of the buttons in the button map using a standard input/output device.

21 Claims, 8 Drawing Sheets

Button State Transition Diagram

SYSTEM AND METHOD FOR CREATING A BUTTON MAP FOR IMPLEMENTING REMOTE CONTROL FUNCTIONS FOR A MOUSE IN A VIDEO PLAYBACK SYSTEM

CROSS-REFERENCE TO RELATED APPLICATION

This application claims priority to, and the benefit of, U.S. Provisional Patent Application entitled, "SYSTEM AND METHOD FOR IMPLEMENTING REMOTE CONTROL FUNCTIONS IN A MOUSE IN A VIDEO PLAYBACK SYSTEM," having Ser. No. 60/807,941, filed on Jul. 21, 2006, which is incorporated by reference in its entirety.

TECHNICAL FIELD

The present disclosure is generally related to implementation of remote control functions in input/output devices in video playback system and, more particularly, is related to a system and method for generating a button map used in implementing remote control functionality with a mouse in a video playback system.

BACKGROUND

Video playback systems are well known, and there are a variety of current standards that govern the format and other attributes associated with the various video playback systems. Today, the DVD (Digital Video Disc) standard is the predominant format utilized for optical disc storage because of its high storage capacity, thus enabling high quality video and audio to be stored. Consequently, media content such as movies, television shows, and music videos are made widely available in DVD format. One of the appealing aspects of DVDs over other storage formats such as VHS tapes (Video Home System) is the interactive menu(s) offered on DVDs in addition to the movie itself. These interactive menus have become an integral part in fully enjoying media content, such as a movie or television show on a DVD. For example, now, in addition to watching a movie, consumers can select specific chapters to view, set audio/video options (language for the movie to be played in, subtitles, etc.), and even watch additional footage such as a "behind-the-scenes" look in making the movie. Some DVDs even offer "alternate endings" where consumers can actually select an ending of their choice should they not like the original ending. Since DVD players first became available to consumers in the mid to late 1990's, DVD players are common in many households. This is due in part to the drop in cost of DVD players, therefore making them affordable to consumers. Furthermore, today most personal desktop and laptop computers are sold with a DVD-ROM player built in, making DVD players even more widespread and even more portable than before.

Typically, with a conventional stand-alone DVD player (e.g., a player not integrated into a computer system and one that requires a separate display device such as a television), the DVD player will come with a remote control which the consumer uses to access features offered by a DVD. With this remote control, the consumer is able to navigate through the hierarchy of interactive menus a particular DVD might offer. A typical remote control for a DVD player will include a set of up/down and left/right arrows. Some remote controls might include a SELECT button in the middle of an arrangement of up/down, left/right navigational buttons. The navigational buttons allows users to intuitively move more around within a menu. For example, in a screen allowing the user to select a specific chapter to view, a series of thumbnail screen shots might be shown on the screen in a grid arrangement (e.g., in a 2×2 arrangement). A particular thumbnail, say the upper left thumbnail on the screen, might be selected by default and highlighted. From there, the user would simply use the up/down, left/right navigational buttons to highlight a different thumbnail until the desired thumbnail is highlighted. The user might then press the SELECT button to enter his selection. Based on this, the corresponding chapter in the movie will be played.

With DVD players integrated into desktop computers or laptops, the user will generally rely on a graphical user interface (GUI) instead of a remote control to navigate through the series of menus within a DVD. The GUI will generally emulate the same functionality as a remote control. For example, the user can still select chapters to view, fast forward, reverse, set audio/video options, etc. However, instead of navigating through a menu using a series of up/down, left/right selections, the user might click a button shown on the screen using an input device such as a mouse or touch pad on a laptop.

Today, there are various standards in consideration to become the successor to the DVD standard. Two formats competing to become the next generation optical standard are BLU-RAY DISC® and HD DVD® (High Definition Digital Video Disc). As with these newer standards, BLU-RAY DISC® offers advantages over DVDs and other previous optical standards in various ways including increased storage capacity and enhanced interactivity (disc content authoring, seamless menu navigation, network/Internet connectivity, etc.). The BLU-RAY DISC® framework offers content providers almost unlimited functionality when creating interactive titles. The author has complete freedom in designing the user interface, which is controllable by using standard navigational buttons on a remote control.

With DVDs, playback is interrupted each time a new menu screen is called. For example, if a user desires to change the language from English to French while watching the movie, the user has to select the audio menu. This, however, causes the movie to stop playing, and a menu is displayed for the user to select from. Upon making his selection, the user then returns back to viewing the movie. Due to BLU-RAY DISC's® ability to read data from the disc without interrupting the current audio/video stream, various menus can be displayed while the movie is playing. Furthermore, the menus may consist of several pages. Users will be able to browse through various pages of menu selections without interrupting the movie.

Also with DVDs, user browsable slideshows were not possible with uninterrupted audio. As a result of BLU-RAY DISC's® ability to read data from the disc without interrupting the current audio/video stream, users can browse through various still pictures (e.g., snapshots of various scenes in the movie) while the audio remains playing. This applies not only to forward and backward selections: A user can make different selections on what picture to view (or select from a screen presented with thumbnail images) while the audio remains playing. With DVDs, subtitles were stored in the audio/video stream, and therefore they had limitations on the number of languages and display styles. Again, it is due to BLU-RAY DISC's® ability to read data from the disc without interrupting the current audio/video stream, that subtitles can be stored independently on the disc. A user may select different font styles, sizes and colors for the subtitles, or location on screen, depending on the disc's offerings. Subtitles can be animated, scrolled or faded in and out.

As with the BLU-RAY DISC® standard, new features have also been added to the new HD DVD® standard which provide for enhanced interactive features over DVDs. The HD DVD®framework also allows interactive content to be authored for discs.

Regardless of the particular standard, newer-generation video standards such as BLU-RAY DISC® and HD DVD® are providing greater levels of user control and interactivity with the underlying video content. One area embodying such interactivity relates to the presentation and utilization of buttons. As is known, in interactive graphics, a menu contains one or more pages. Similarly, a page contains one or more buttons, and a button is defined by coordinates (e.g., x-y coordinates), a graphical object, and one or more associated commands. For example, in the context of a DVD video, a user is typically provided with various functions, such as a scene-selection function. In this function, a user may be presented with a variety of single image graphics, which are taken from, and associated with, each of a plurality of scenes. By using the remote control for the DVD player, the user may highlight, or select, any of these images, and may further instruct the DVD player to proceed directly to a given scene by activating the corresponding highlighted image.

From a more technical standpoint, these images, as seen by the user, are provided in the form of mechanisms called "buttons." Note that this is not to be confused with reference to buttons on a remote control. As mentioned above, each such button is defined by coordinates (e.g., the x and y location where the button will be presented on the screen), a graphic object (i.e., the image that is presented to the user), and one or more associated commands (e.g., a command that directs the DVD player to jump or skip directly to a selected scene).

Reference is now made to FIG. 1, which depicts an exemplary multi-page menu within a video playback system, such as a DVD player. A user typically navigates through the various pages using a remote control. When a user inserts a video disc (e.g., a DVD video), a main menu may be presented on a first page 102 to a user displaying "Main Menu" 104, "Languages" 106, and "Chapters" 108. Using the arrow keys on a remote control for the DVD player, the user may highlight the button for the "Languages" menu 106 option. Once highlighted, the user may press the SELECT key on the remote control, which causes a second page 110 to be presented to the user, having a heading of "Languages" 112. Underneath this heading, a series of buttons may be presented for each language of the associated audio. The languages illustrated in FIG. 1 are "English" 114 and "French" 116.

Alternatively, and as indicated in FIG. 1, if the user highlighted and activated the "Chapters" button 108 from the first page 102, then the third page 118 is presented to the user. As illustrated, this third page includes a heading of "Chapter 1" 120 along with four additional buttons labeled as "Scene 1" 122, "Scene 2" 124, "Main" 126, and "Next" 128. Again, the user may navigate these buttons using the arrow keys on the remote control to highlight any of these buttons. Once highlighted, the user may press a SELECT key provided on the remote control to activate the given button. For example, and as illustrated in the figure, if the user were to activate the "Next" button 128, then the menu would proceed to display a fourth page 132 (presenting image buttons for "Scene 3" 134 and "Scene 4" 136 to the user). As is known, new video standards provide for these and other robust interactive features, which have generally enhanced the user's experience with the graphics medium.

Notwithstanding these enhanced features, however, certain problems have been found to arise. One example where such problems have been found to arise is in the use of computers (rather than designated video players) to display or view the videos. Specifically, a problem arises when using standard input/output devices of a computer, such as a mouse, to interact with the video content, instead of using the remote control that is provided with a dedicated video player (e.g., DVD player). When the same video disc is being executed or displayed on a computer, it has been found that a user may freely select otherwise non-selectable buttons, simply by moving the mouse over the top of the button. Returning to the example presented above, if the user were to move the mouse across the "Languages" button 112 on the second page 110, this would result in an unintended operation. Depending on how the underlying computer program handled it, various different and unintended results could occur. For example, the button may be presented in a highlighted fashion to the user. However, when the user left-clicks the mouse to activate the button, the video program may do nothing as the video disc does not intend that button to be one that can be selected or activated from that page. As an example, in the second page 110, the "Languages" button 112 is not intended to be selectable as denoted by the dotted lines. Only the two buttons below this button ("English" 114 and "French" 116) are meant to be selectable. Attempting to activate the "Languages" 112 button in this case could cause the computer program to crash, depending on how the underlying application processes the selection request.

For purposes of providing nomenclature herein, a button, typically, has one of four possible states. Reference is now made to FIG. 2, which depicts the different states for buttons within a video playback system. These states include a "disabled" state 202, a "normal" state 204, a "selected" state 206, and an "activated" state 208. Referring back to FIG. 1, for the second page 110 being displayed, the "Languages" 112 button would be in a disabled state, as the underlying video content software does not intend for that button to be selected from that particular page. (This is denoted by the dotted line around the button.) The "French" button 114 is in the normal state, while the "English" button 114 is in the selected state. When the user clicks the left mouse key, when the mouse pointer is overlying a selected button, or when the user presses the SELECT key of a remote control for a selected button, then that selected button becomes activated and therefore enters the activated state 208. The activated state 208 is a temporary state, which typically leaves the underlying video content or software to execute the one or more commands that are associated with the button.

As illustrated in FIG. 2, from the activated state 208, a button may proceed to any of the other three possible states. Again in FIG. 1, for the first page the "Languages" button 106 is selected. Upon activation of the "Languages" button 106, the associated command causes, among other possible operations, the menu to proceed to the second page 110. At this time, the "Languages" button 112 enters the disabled state, as it is not intended for selection from this page of the menu. To provide a specific illustration, and returning to FIG. 1, in the last three pages (of the four pages presented in the figure), the top-most button may be a non-selectable button. That is, in the second page 110, the figure illustrates three buttons of "Languages" 112, "English" 114, and "French" 116. The system, however, may be designed to only permit the user to select the buttons of "English" 114 and "French" 116. In this regard, the "Languages" button may be a non-selectable button. Thus, when the "English" 114 is highlighted, and the user depresses the up arrow key on the remote control the "Languages" will not be highlighted or selected when a user interacts with the video disc using the remote control of the dedicated video disc player.

Such features may be implemented, in part, through certain properties of buttons, such as a "neighbor" property. As is known, and defined by certain video specifications (e.g., BLU-RAY Disc® specification) a button may be defined to have neighbors to the left and right or top and bottom. In such a situation, when a given button is selected (e.g., highlighted) pressing any of the up-arrow, down-arrow, left-arrow, or right-arrow button on the remote control operates to select, or highlight, the button that is defined to the be neighbor of the selected button in the direction selected by the remote control. However, it is not required that neighbors be so associated with buttons in any given direction (or even at all). Therefore, in returning to the figure, it may be that only the "French" button 116 is associated with the "English" button 114 as a neighbor. Therefore, when the "English" button 114 is selected, only the down-arrow key will be recognized as a valid or legitimate arrow-key input (e.g., other arrow keys are ignored). This way, the user is not permitted to select, with the remote control, any button presented on the screen that is not intended for selection in the current page or context of the video presentation.

However, when the same video disc is being executed or displayed on a computer, it has been found that a user may freely select otherwise non-selectable buttons, simply by moving the mouse over the top of the button. Returning to the example presented above, if the user were to move the mouse across the "Languages" button 112, this would result in an unintended operation. Depending on how the underlying computer program handled it, various different and unintended results could occur. For example, the button may be presented in a highlighted fashion to the user. However, when the user left-clicks the mouse to activate the button, the video program may do nothing (as the video disc does not intend that button to be one that can be selected or activated from that page). Alternatively, attempting to active such a button could cause the computer program to crash.

An example of another issue when attempting to use a mouse or other computer input device arises when two buttons are overlaid with each other. When playing a video disc using a computer and while interfacing with the interactive video disc using an input device such as a mouse, problems may arise. As noted above, one problem may be that the system generates errors or confusing results when the mouse is moved over any of buttons in a normal state, but not intended for selection. In addition, when using the mouse to select the overlaid buttons, the user does not have a ready means for toggling between those two buttons, since they are displayed in identical locations on the screen. In this regard, pressing the mouse key will select whichever of those buttons is currently highlighted, but will not permit the user to toggle to the other button, since the mouse does not have a key corresponding the left-arrow or right-arrow keys of the remote control.

Yet another issue or problem arises in connection with the use of "transparent" buttons or buttons that are too small in size. Transparent buttons are sometimes used as a convenient tool to provide an action when a user depresses a certain button on the remote control input device, without visibly presenting the button to the user. Because these buttons may not be visible to the user, it is not feasible for a user to use a mouse to select these buttons because the precise location is not known.

The foregoing presents just a few examples of situations in which interactive video graphics are provided which require special selection methods beyond the conventional "point-and-click" action of a mouse. Accordingly, solutions to these and other similar problems are desired. One key aspect of embodiments of the present invention is the detection and identification of buttons that require special selection methods beyond conventional means of selecting buttons with a mouse. Another key aspect of embodiments of the present invention is the use of button maps, which identify and store all "numeric" buttons within a given page. Numeric buttons are buttons that have a corresponding number associated with them and that would normally be selected by pressing the same corresponding number key on a remote control. Button maps contain a complete listing of all buttons that may be selected using special selection methods disclosed for various embodiments of the present invention. Buttons not within the button map are simply ignored. Therefore, there exists a need, among others, for providing users with the ability to utilize the interactive graphics within video content using standard input/output devices of a computer. There also exists a need, among others, for providing users with a means for identifying and selecting from a group of numeric buttons within pages in a video playback system. Broadly, the embodiments of the present invention provide robust or effective solutions or workarounds to the problematic issues that arise in connection with buttons in pages within an interactive video playback system.

SUMMARY

Briefly described, one embodiment, among others, is directed to a method for creating a button map for implementing remote control functions for a standard input/output device in a video playback system. The method includes first adding a button that is currently selected along with its neighboring selectable buttons to a button map, iteratively adding a new selectable button not in the button map and then adding all neighboring selectable buttons for the new button to the button map. Finally, the method includes selecting one of the buttons in the button map using a standard input/output device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of a method for creating a button map for implementing remote control functions using a standard input/output device and the underlying methods can be better understood with reference to the following drawings. The components in the drawings are not necessarily to scale, emphasis instead being placed upon clearly illustrating the principles of remote video editing system. Moreover, in the drawings, like reference numerals designate corresponding parts throughout the several views.

DETAILED DESCRIPTION

Figure 1:
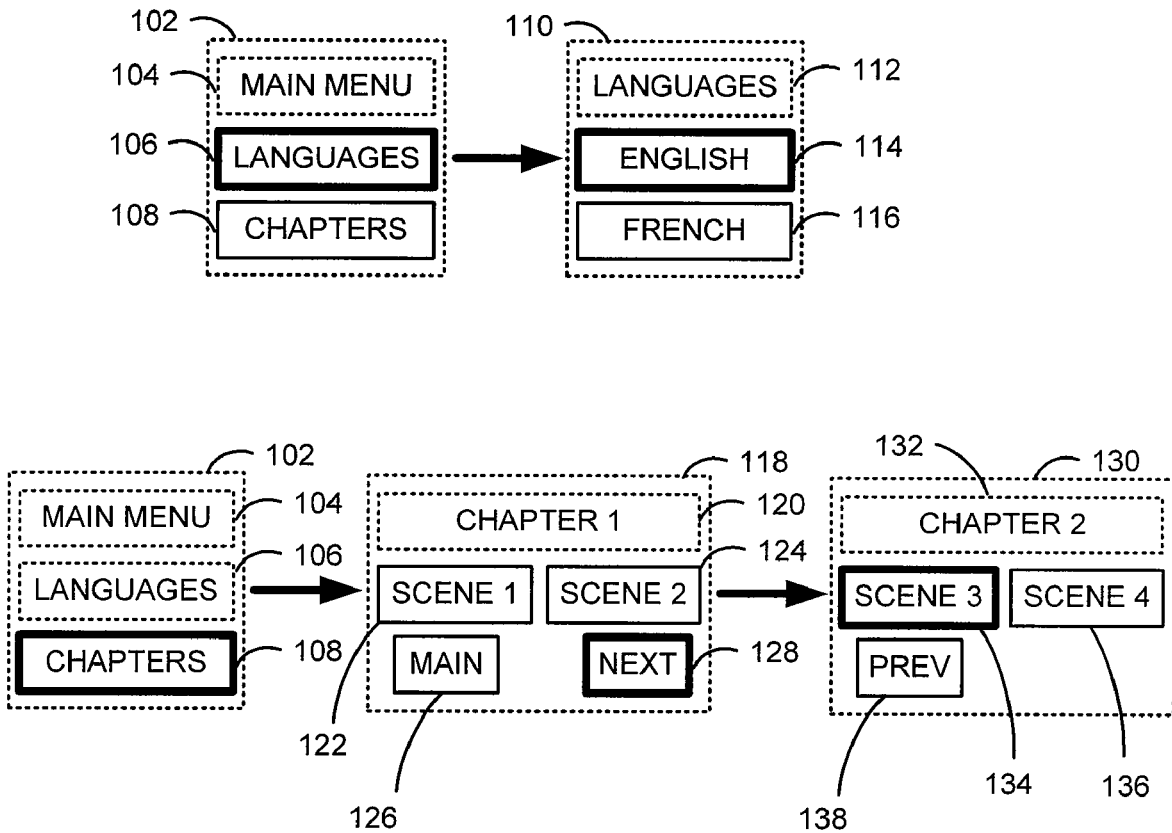
FIG. 1 depicts an exemplary multi-page menu within a video playback system.
Figure 2:
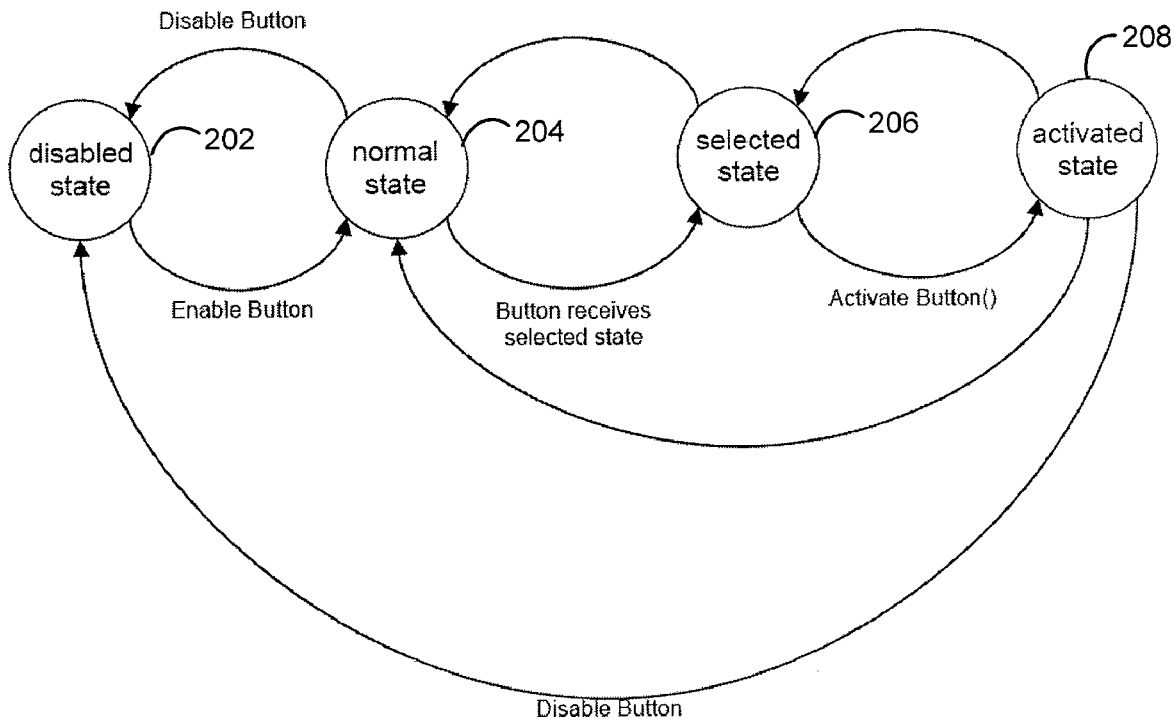
FIG. 2 depicts the different states for buttons within a video playback system.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Embodiments of systems and methods for creating a button map for numeric buttons in a video playback system are described. Button maps generally refer to a list of all selectable numeric buttons located in a given page. The list corresponds to buttons that require special selection methods using a standard input/output device, such as a mouse.

Figure 3A:
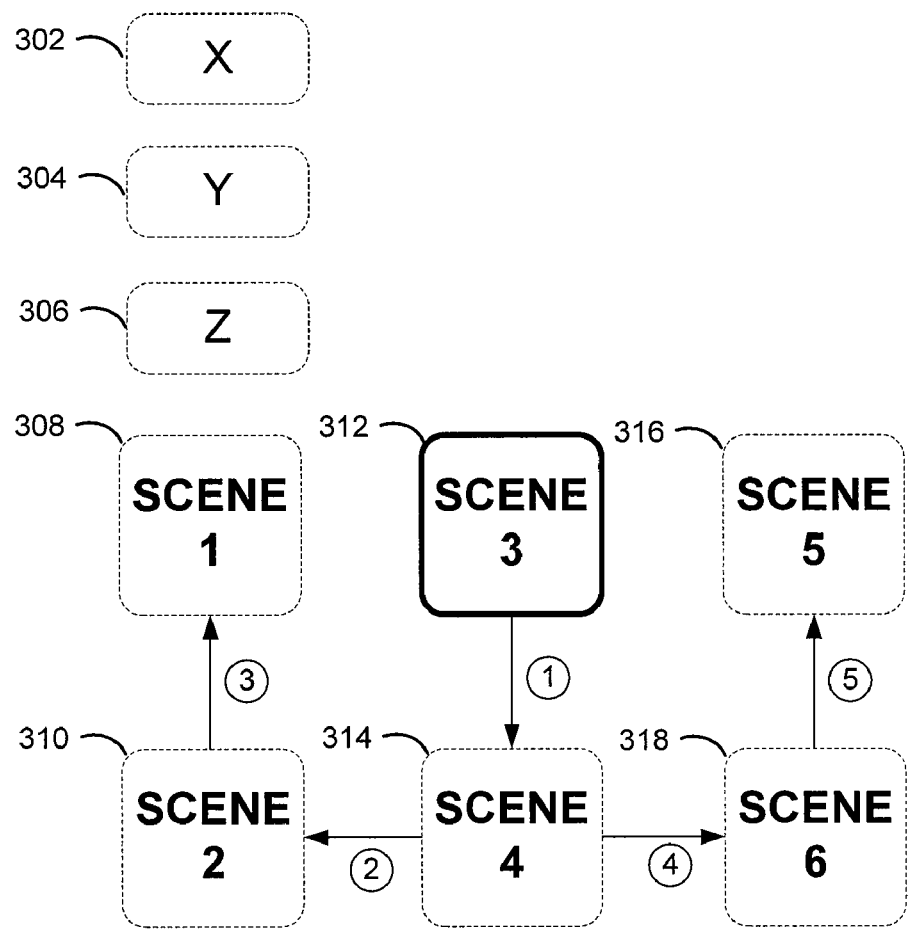
FIG. 3A illustrates the basic operation of constructing a button map within a multi-page menu.

Reference is now made to FIG. 3A, which illustrates the basic operation of constructing a button map within a multi-page menu. By way of example, FIG. 3A shows two series of buttons within a page in a video playback system. The first series is comprised of buttons X, Y, Z 302, 304, 306, and the second series is comprised of buttons 308, 310, 312, 314, 316, 318 labeled "SCENE 1" through "SCENE 6." In this illustration, no numeric values are associated with any of the first series of buttons 302, 304, 306. For the second series of buttons, however, the buttons 308, 310, 312, 314, 316, 318 have associated numeric values of 1-6, respectively. For this example, the associated numeric values correspond to particular scene numbers. Typically, a remote control would be used to activate a particular button by simply pressing a corresponding numeric button on the remote control. In one embodiment of the present invention, remote control functionality is implemented for a standard input/output device, such as a mouse. Such an embodiment permits selection and activation of numeric buttons through the use of a button map, which contains a listing of all numeric buttons. For the first series of buttons, no button map is created since no numeric buttons are associated with any of the buttons in that series. In constructing a button map for the second series, a default button is first identified. The default button is the button within the page that is automatically placed in select mode (e.g., highlighted) when a new page is presented to the user. This may be any button within the page. For example, the default button might be the upper left-most button in a page that presents a three-by-three grid of numeric buttons. In FIG. 3A, "SCENE 3" has been designated as the default button, as denoted by the solid line around the button, and is thus currently selected. This button is stored in the button map and serves as the starting point for creating a button map. Next, the first set of neighboring buttons that surround the default button (i.e., "SCENE 3") is identified. In this case, the neighboring buttons would be "SCENE 1" 308 (left neighbor), "SCENE 4" 314 (bottom neighbor), and "SCENE 5" 316 (right neighbor). These buttons are also then added into the button map. From here, all the neighboring buttons for each of these neighboring buttons is determined. One should note that the order in which the first set of neighboring buttons is processed determines the order in which the remaining buttons are identified and stored into the button map. However, the order in which buttons are added to the button map is not important because all the numeric buttons within the page are eventually added to the button map. As an example, in FIG. 3A, if "SCENE 4" 314 is the first button within the first set of neighboring buttons to be processed, then "SCENE 2" 310 could next be processed. (Alternatively, "SCENE 6" 318, the right neighbor of "SCENE 4" 314, could be processed first.) Next, the neighboring buttons for "SCENE 2" 310 would be identified. In FIG. 3A, this would be "SCENE 1" 308. This traversing occurs in a recursive fashion until there are no more buttons in that branch. Since "SCENE 1" 308 has no remaining undiscovered neighboring buttons, the next button to be processed would be "SCENE 6" 318, the right neighbor of "SCENE 4" 314. From there, the top neighbor of "SCENE 6" 318 is identified as "SCENE 5" 316. Again, this traversing occurs in a recursive fashion until there are no more buttons in that branch. Finally, when there are no remaining numeric buttons to be identified within the page, the button map is complete.

Figure 3B:
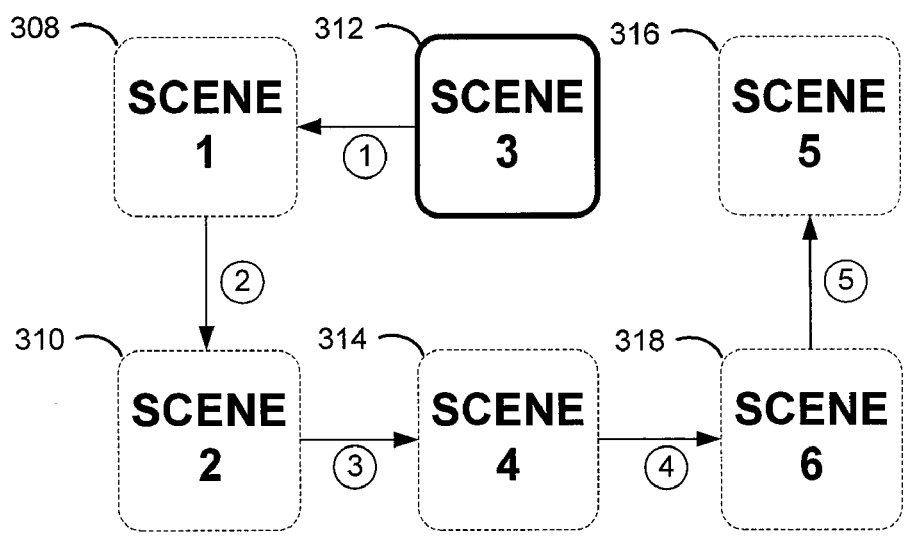
FIG. 3B illustrates another embodiment of the present invention for constructing a button map within a multi-page menu.

FIG. 3B illustrates another embodiment of the present invention for constructing a button map within a multi-page menu. In this case, "SCENE 1" 308 is the first button within the first set of neighboring buttons around the default button, "SCENE 3" 312 to be processed. As noted above, the order in which the buttons within the first set of neighboring buttons is processed will determine the order in which numeric buttons are discovered. In this case, "SCENE 2" 310, the bottom neighbor of "SCENE 1" 308 would be processed next. This takes place in a recursive fashion until all neighbors for that particular button are processed. Therefore, in this example, "SCENE 4" 314, then "SCENE 6" 318, then finally "SCENE 5" 316 would be processed. It should be emphasized that the above-described embodiments in FIG. 3A and FIG. 3B are merely examples of possible implementations. Many variations and modifications may be made to the above-described embodiments without departing from the principles of the present disclosure. All such modifications and variations are intended to be included herein within the scope of this disclosure.

Figure 4:
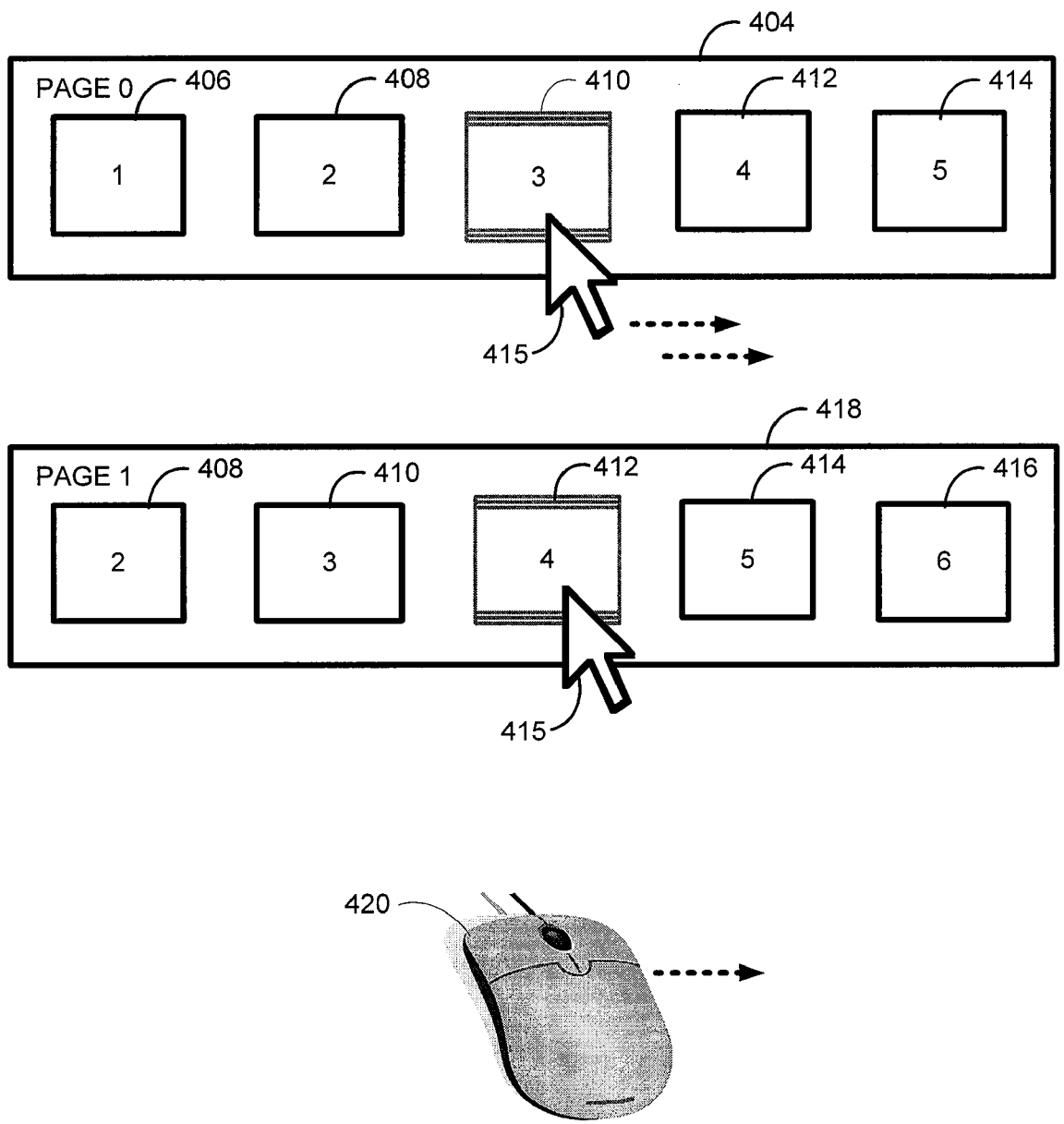
FIG. 4 depicts an example where remote control functionality for a mouse is implemented for a video playback system.
Figure 5:
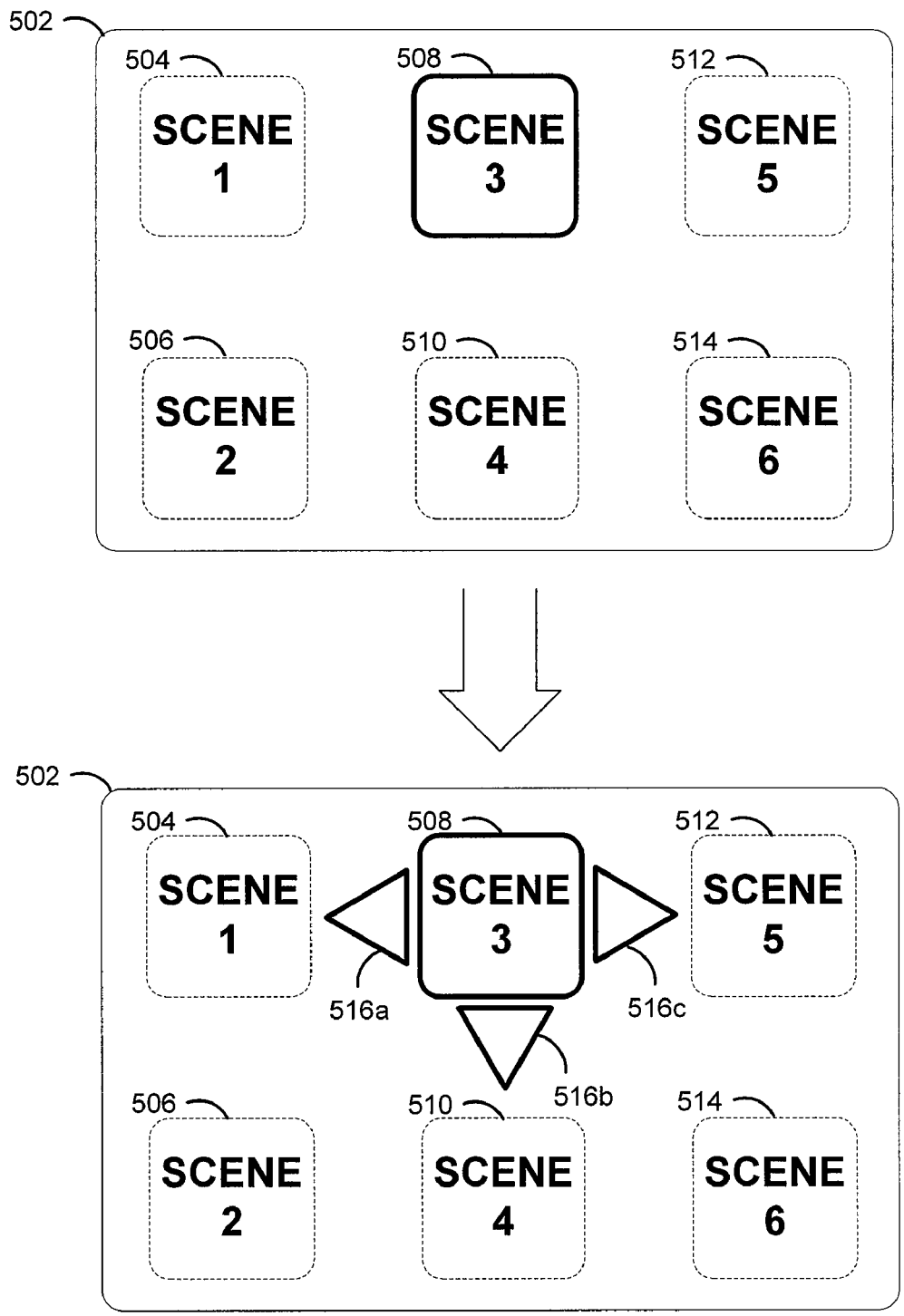
FIG. 5 depicts another example where remote control functionality for a mouse is implemented for a video playback system.

Reference is now made to FIGS. 4 and 5, which depict various examples of selection methods using a mouse in a video playback device. FIG. 4 illustrates the selection of numeric buttons within a button map by dragging a mouse. Consider a situation in which a "Page 0" 404 displays five buttons 406, 408, 410, 412, 414, with the third button 410 currently selected. Furthermore, assume that the third button 410 defines the second button 408 as a left neighbor and the fourth button 412 as a right neighbor. With the third button 410 selected, dragging the mouse in either the left or right directions will result in selection of the corresponding neighbor. Therefore, if the mouse is dragged to the right as illustrated in FIG. 4, the resulting operation may be the presentation of "Page 1" 418, which now shows the fourth button 412 as being selected. From this page, selection of button three 410 or five 414 may be accomplished either to the left or right, in a similar fashion. Similar operations could likewise be implemented by dragging operations in the up or down directions as well.

FIG. 5 illustrates another example of the selection of numeric buttons within a button map. In this example, the selection of buttons is accomplished through the use of graphical arrows. In FIG. 5, a sample page 502 from a menu is shown with various scenes 504, 506, 508, 510, 512, 514 available for selection. Upon downloading interactive content from the server 116, the user 120 is able to navigate within the page 502 through the use of graphical arrows 516a, 516b, 516c. In this example, "SCENE 5" is currently selected. If the user desires to view "SCENE 4" 510 instead, he could simply click on the down arrow 516b to select that particular scene. Likewise, if the user 120 elected to view "SCENE 5" 512, he could simply click on the right arrow 516c to select that particular scene. FIGS. 4 and 5 are just some examples of interactive content which may be generated to provide remote control functionality for standard input/output devices.

Figure 6:
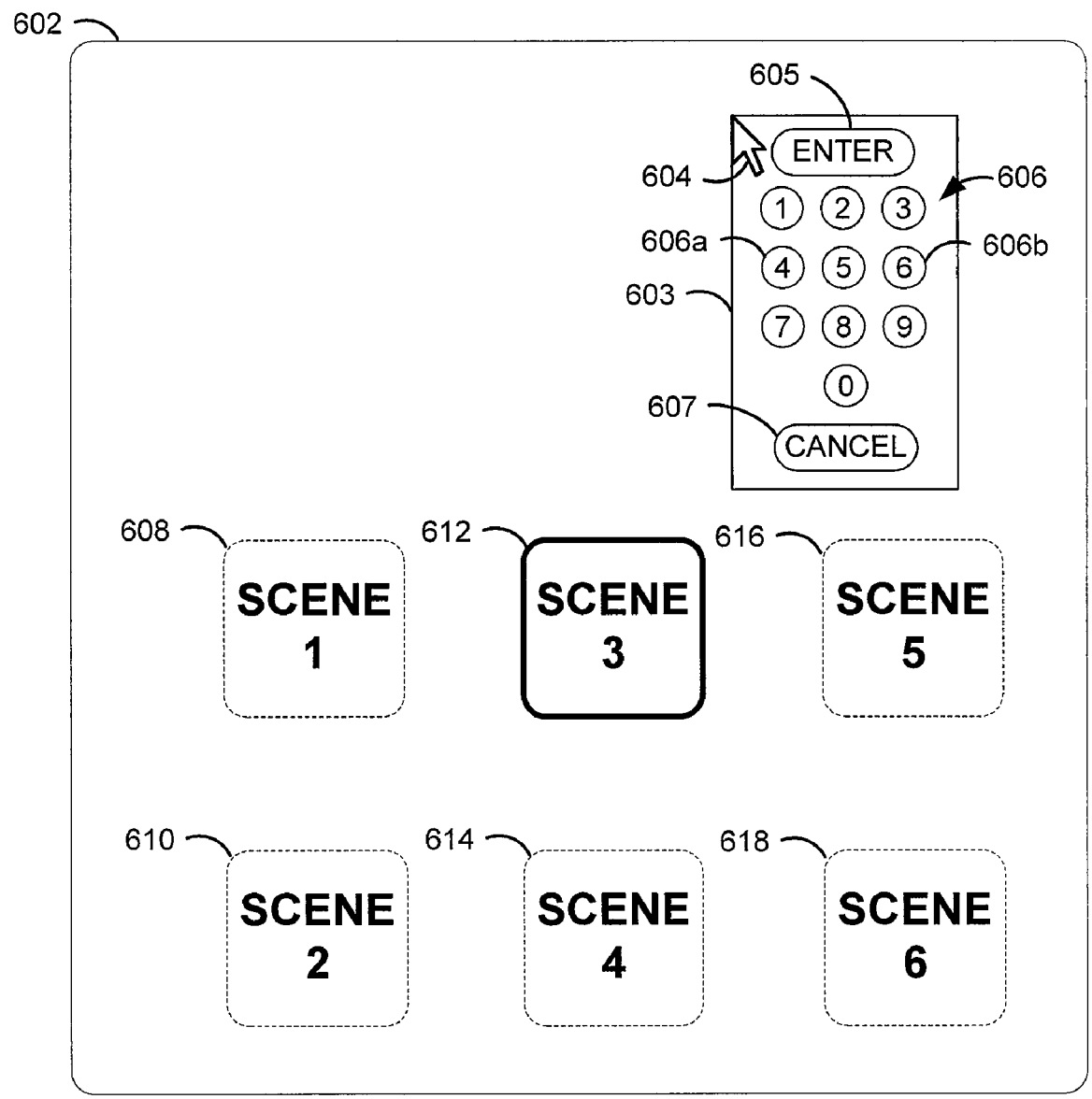
FIG. 6 depicts another example where remote control functionality for a mouse is implemented for a video playback system.

FIG. 6 illustrates yet another example of the selection of numeric buttons within a button map. In this example, the selection of buttons is accomplished through the use of a context menu emulating a remote control. A typical page 602 is shown with a series of numeric buttons 608, 610, 612, 614, 616, 618 shown. A button map has been created which contains all the numeric buttons. Here, "SCENE 1" through "SCENE 6" have associated numeric buttons that have been identified and stored in the button map. A context menu 603 might be invoked by moving a mouse 604 over any location within the page 602 and clicking a button (e.g., right mouse key). The context menu presents the user with various actions that may be executed with respect to the buttons. In some embodiments of the present invention, the context menu may emulate a remote control as seen in FIG. 6. In this example, some basic features of a typical remote control are emulated and provided for the user to select from. The context menu 603 might include a numeric key pad 606 and an "ENTER" button 605. To close the context menu, a "CANCEL" 607 button might also be made available. A user selects one of the numbers by simply clicking on the number and then clicking the "ENTER" 605 button to activate the button. For example, to select "SCENE 4" 614, the user would click on the number 4 606a in the context menu 603. Likewise, to select "SCENE 6" 618, the user would click on the number 6 606b in the context menu 603. If the user invokes the context menu 603, but elects not to make any selection, the "CANCEL" 607 button may be clicked on.

Figure 7:
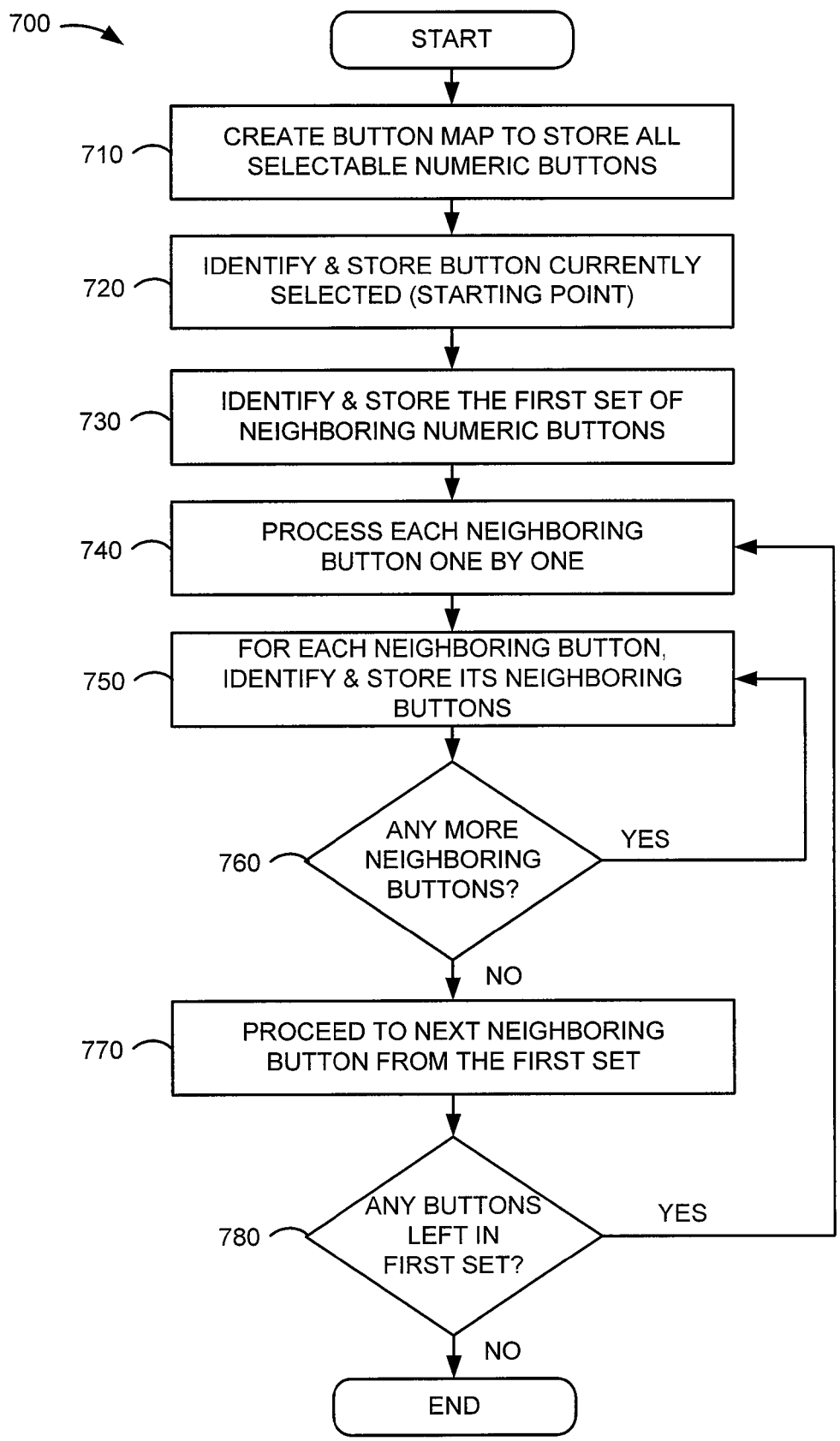
FIG. 7 is a flowchart of a top-level functional operation of a method for constructing a button map for a multi-page menu in a video playback system.

FIG. 7 is a flowchart of a top-level functional operation of a method for creating a button map selecting numeric buttons in a video playback system. Beginning with step 710, a button map is created to store numeric buttons identified within the page. Next in step 720, a default button is identified within the page. The button serves as the starting point from which traversing occurs. In step 730, all of the neighboring buttons of the default button is identified and stored. This comprises the first set of neighboring buttons. From here, all the neighboring buttons for each button within the first set of neighboring buttons is identified and stored (step 740). This takes place in a recursive fashion until all the buttons for a given branch have been identified and stored (steps 750-760). In step 770, the next neighboring button from the first set of neighboring buttons surrounding the default button is processed. This continues until each button within the first set of neighboring buttons has been processed (step 780). At this point, the button map is complete and all numeric buttons within the page have been stored.

Figure 8:
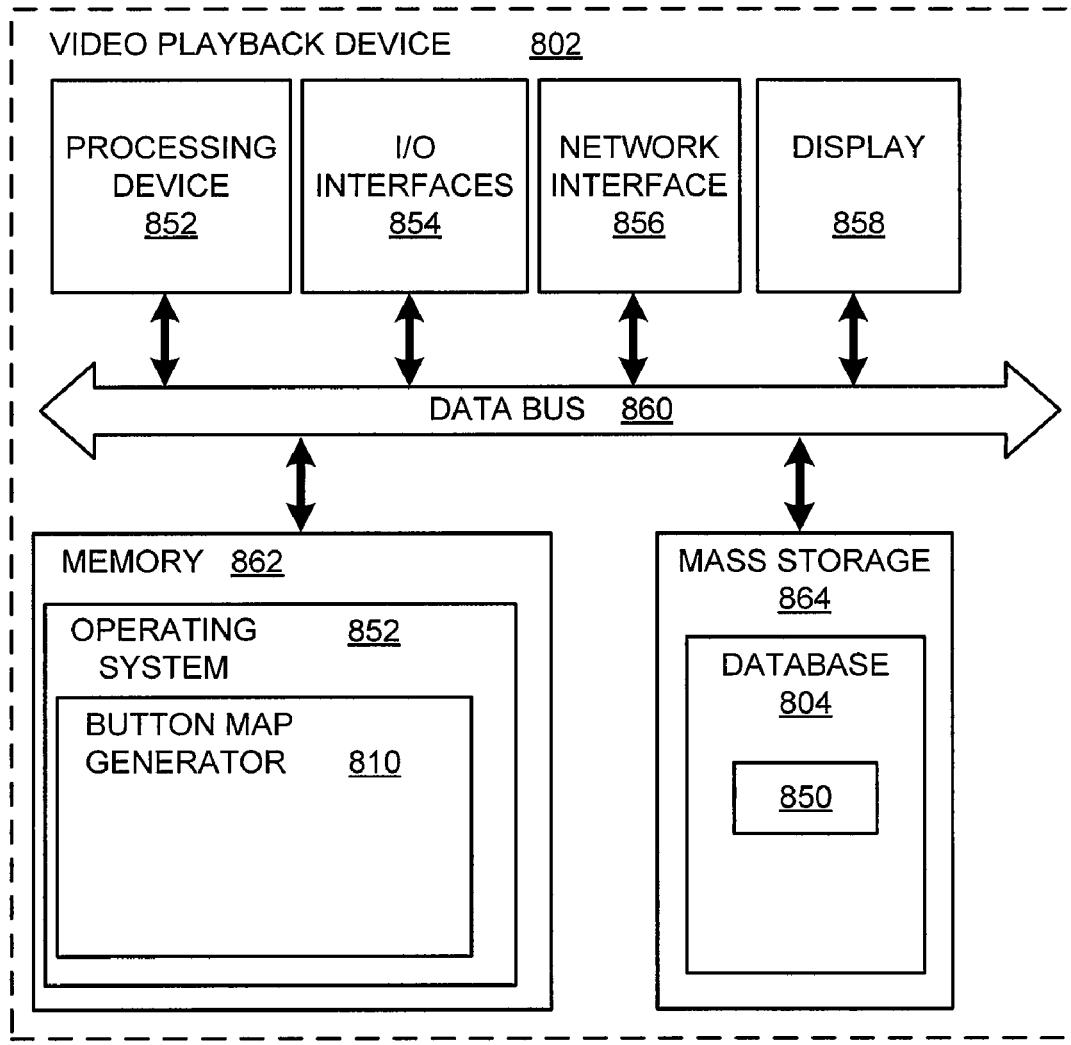
FIG. 8 depicts a block diagram illustrating an exemplary embodiment of a video playback device 802 on which a button map generator 810 may be executed.

FIG. 8 depicts a block diagram illustrating an exemplary embodiment of a video playback device 802 on which a button map generator 810 may be executed. Generally speaking, the video playback device 802 can comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, the video playback device 802 can, for instance, comprise memory 862, a processing device 852, a number of input/output interfaces 854, a network interface device 856, and mass storage 864, wherein each of these devices are connected across a data bus 860. Display 858 can comprise a computer monitor or a plasma screen for a PC or a liquid crystal display (LCD) on a hand held device, for example.

Processing device 852 can include a custom-made or commercially available processor, a central processing unit (CPU) or an auxiliary processor among several processors associated with the video playback device 802, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 862 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 862 typically comprises a native operating system 852, one or more native applications, emulation systems, or emulated applications for any of a variety of operating systems and/or emulated hardware platforms, emulated operating systems, etc. For example, the applications may include the button map generator 810 used to generate and update a button map 850. One of ordinary skill in the art will appreciate that memory 862 can, and typically will, comprise other components, which have been omitted for purposes of brevity.

Input/output interfaces 854 provide any number of interfaces for the input and output of data. For example, where the video playback device 802 comprises a personal computer, these components may interface with a user input device 854, which may be a keyboard or a mouse. Where the video playback device 802 comprises a handheld device (e.g., PDA, mobile telephone), these components may interface with function keys or buttons, a touch sensitive screen, a stylist, etc.

With further reference to FIG. 8B, mass storage device 864 may be, for example, a disk drive, flash memory, or any other of a wide variety of storage devices capable of storing data. For some embodiments of the present invention, the mass storage device 864 may contain a database 804 which stores a button map 850 generated by the button map generator 810.

Some embodiments of the present invention made include a network interface device 856 comprised of various components used to transmit and/or receive data (e.g., a button map 850) over a network. By way of example, the network interface device 856 may include a device that can communicate with both inputs and outputs, for instance, a modulator/demodulator (e.g., a modem), wireless (e.g., radio frequency (RF)) transceiver, a telephonic interface, a bridge, a router, network card, etc.).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for discovering buttons in pages associated with one or more menus presented within a video playback system comprising:
   retrieving a plurality of buttons from the one or more menus in a video content, wherein the buttons are originally designed for selection via a remote control with up, down, left, right, numeric, and select functionalities, wherein the buttons are incompatible with a standard input/output device other than the remote control, and wherein the buttons comprise selectable buttons and non-selectable buttons;
   creating a button map for identifying all selectable buttons within each page, wherein creating a button map comprises:
   identifying and adding a button currently selected to the button map;
   adding a first set of neighboring-buttons located about the button currently selected to the button map; and
   identifying and adding neighboring buttons in a recursive fashion for each button within the first set of neighboring buttons to the button map until all the selectable buttons within the same page are added to the button map; and
   receiving a selection of one of the buttons in the button map via the standard input/output device.

2. The method of claim 1, wherein the standard input/output device is a mouse device.

3. The method of claim 2, wherein the step of receiving a selection of one of the buttons comprises:
   detecting a depression of a key on the mouse device while the mouse device is positioned over a first button currently selected;
   detecting a drag of the mouse device in the direction of a second button to be selected while detecting a depression of the key; and
   detecting a release of the key on the mouse device once the mouse device is positioned over the second button to select the second button.

4. The method of claim 2, wherein the step of receiving a selection of one of the buttons comprises:
   displaying a visibly distinguishable a first button in a selected state among the buttons within the button map;
   detecting a drag of a mouse device in the direction of a second button to be selected; and
   detecting a cessation of movement of the mouse device when the second button is selected.

5. The method of claim 2, wherein the step of receiving a selection of one of the buttons comprises:
   displaying a visibly distinguishable a first button in a selected state among the buttons in the button map;
   detecting a rotation of a wheel on the mouse device to select a second button in a direction that is correlated to the position of a second button with respect to the first button; and
   detecting a cessation of the rotation of the wheel when the second button is selected.

6. The method of claim 2, wherein the step of receiving a selection of one of the buttons comprises:
   detecting a position of a cursor of a mouse device over one of the buttons within the button map; and
   displaying a context menu upon detecting the depression of a key on the mouse device, the context menu presenting possible actions that can be performed in relation to the button.

7. The method of claim 6, wherein the context menu includes a numeric keypad used to select one of the buttons within the button map.

8. The method of claim 2, wherein the step of receiving a selection of one of the buttons comprises:
   determining the properties for each button within the button map;
   overlaying a graphic display over each button, the graphic display presenting i-all available actions that can be performed in relation to the button based on the properties of the button.

9. The method of claim 1, wherein the button currently selected was automatically selected when the page was presented.

10. The method of claim 1, wherein identifying and adding a button currently selected to the button map further comprises adding a numeric button to the button map.

11. The method of claim 1, wherein the buttons not within the button map are ignored and non-selectable by the standard input/output device.

12. A method for identifying buttons in pages associated with one or more menus presented within a video playback system comprising:
   retrieving a plurality of buttons from the one or more menus in a video content, wherein the buttons are originally designed for selection via a remote control with up, down, left, right, numeric, and select functionalities, wherein the buttons are incompatible with a standard input/output device other than the remote control, and wherein the buttons comprise selectable buttons and non-selectable buttons;
   adding a button currently selected and its neighboring selectable buttons to a button map;
   iteratively adding a new selectable button not in the button map and adding all neighboring selectable buttons for the new button to the button map until all selectable buttons have been added to the button map; and
   receiving a selection of one of the buttons in the button map using the standard input/output device.

13. The method of claim 12, wherein the standard input/output device is a mouse device.

14. The method of claim 13, wherein the step of receiving a selection of one of the numeric buttons comprises:
   detecting a depression of a key on the mouse device while the mouse device is positioned over a first button currently selected;
   detecting a drag of the mouse device in the direction of a second button to be selected while detecting a depression of the key; and
   detecting a release of the key on the mouse device once the cursor of the mouse device is positioned over the second button to select the second button.

15. The method of claim 13, wherein the step of receiving a selection of one of the buttons comprises:
   displaying a visibly distinguishable a first button in a selected state among the buttons within the button map;
   detecting a drag of a mouse device in the direction of a second button to be selected; and
   detecting a cessation of movement of the mouse device when the second button is selected.

16. The method of claim 13, wherein the step of receiving a selection of one of the buttons comprises:
   displaying a visibly distinguishable a first button in a selected state among the buttons in the button map;
   detecting a rotation of a wheel on the mouse device to select a second button in a direction that is correlated to the position of a second button with respect to the first button; and
   detecting a cessation of the rotation of the wheel when the second button is selected.

17. The method of claim 13, wherein the step of receiving a selection of one of the buttons comprises:
 detecting a position of a cursor of a mouse device over one of the buttons within the button map; and
 displaying a context menu upon detecting a depression of a key on the mouse device, the context menu presenting possible actions that can be performed in relation to the button.

18. The method of claim 17, wherein the context menu includes a numeric keypad used to select one of the buttons within the button map.

19. The method of claim 12, wherein the button currently selected was automatically selected when the page was presented.

20. The method of claim 12, wherein identifying and adding a button currently selected to the button map further comprises adding numeric button to the button map.

21. The method of claim 12, wherein the buttons not within the button map are ignored and non-selectable by the standard input/output device.

* * * * *